United States Patent [19]
Harmon et al.

[11] 4,171,379
[45] Oct. 16, 1979

[54] FEED SUPPLEMENT FOR BABY PIGS

[75] Inventors: Bud G. Harmon, Kirkwood; Leroy V. Skoch, Manchester; Charles W. Dickerson, Des Peres, all of Mo.

[73] Assignee: Ralston Purina Company, St. Louis, Mo.

[21] Appl. No.: 893,735

[22] Filed: Apr. 5, 1978

[51] Int. Cl.² ............................................... A23K 1/00
[52] U.S. Cl. ........................................ 426/2; 424/147; 424/295; 426/658
[58] Field of Search ...................... 426/2, 69, 805, 630, 426/623, 807, 658, 74, 6; 424/147, 295

[56] References Cited
U.S. PATENT DOCUMENTS

| | | | |
|---|---|---|---|
| 2,955,981 | 10/1960 | Linkenheimer | 424/295 |
| 3,259,500 | 6/1966 | Barnhart et al. | 424/295 X |
| 3,332,778 | 7/1967 | Wilkening | 426/2 |
| 4,016,296 | 4/1977 | Desantis | 426/658 |
| 4,027,043 | 5/1947 | Schroeder et al. | 426/74 |

Primary Examiner—R. B. Penland
Attorney, Agent, or Firm—W. Dennis Drehkoff

[57] ABSTRACT

A method of preventing iron deficiency anemia in baby pigs and an animal feed supplement containing an iron source is disclosed. The molasses based feed supplement block, intended for consumption primarily by baby pigs, contains fat as a major energy source to aid in weight gain and an effective amount of a nutritional iron source to inhibit anemia in baby pigs. The animal feed supplement may also contain ferrous sulfate to aid in the setting of the supplement in block form.

11 Claims, No Drawings

FEED SUPPLEMENT FOR BABY PIGS

BACKGROUND OF THE INVENTION

This invention relates primarily to an animal feed supplement and, more particularly to improvements in an animal feed supplement in block form and most particularly to a method of treating or preventing iron deficiency anemia in baby pigs.

The danger of iron deficiency anemia occurs within the first three or four weeks of life of the baby pig. During this period the baby pig lives by natural preference on the sow's milk which has a very low iron content. Iron deficiency anemia in baby pigs may result from a low iron content in the sow's milk, low amount of iron in the baby pig at birth, low amount of available iron in the pig's environment and a rapid rate of growth. Iron deficiency anemia can be prevented by a supplemental supply of iron, provided the anemia has not become so severe as to produce permanent damage.

The ingestion of dirt and sod by baby pigs in order to prevent anemia has obvious disadvantages. Modern methods being practiced to prevent iron deficiency include iron supplementation either orally or by injection. These procedures are labor intensive and expensive. There are many known salts of iron which can be administered to the baby pig in an effort to prevent iron deficiency anemia. The present invention is based on the discovery that the inclusion of a nutritional iron source in a molasses based nutrient feed block will provide the baby pig with a palatable method of treating iron deficiency anemia while also supplying energy in the supplement.

Copending U.S. patent application Ser. No. 893,736 is directed to animal feed blocks and the preparation thereof wherein molasses, water, clay, and a phosphorous source are subjected to high speed shearing action to obtain a dispersed mixture thereof; and thereafter magnesium oxide and a blocking agent, ferrous sulfate, are added to the mixture to obtain a nutrient feed block which sets to become hard and weather resistant in one hour or less at ambient temperature.

SUMMARY OF THE INVENTION

It is an object of the present invention to provide a novel animal feed supplement composition which embodies an energy source as a major ingredient in a solid weather resistant block form.

Another object of the invention is to provide a hard animal feed block containing a nutritional iron source for the treatment of iron deficiency in baby pigs.

And yet another object of the invention is to provide a hard, weather resistant animal feed block providing energy rich ingredients in a suitable medium for ingestion by baby pigs.

Copending application Ser. No. 893,736 in Example IV illustrates the use of a molasses based feed block is a carrier for medicaments. In accordance with this invention, it has been unexpectedly discovered that the animal feed block described in application Ser. No. 893,736 provides a method of treating or inhibiting iron deficiency as well as providing energy supplying ingredients to baby pigs in a palatable form.

DETAILED DESCRIPTION OF THE INVENTION

A typical formulation for the product used in the method of treating or inhibiting iron deficiency anemia in baby pigs comprises the following ingredients:

| INGREDIENTS | % BY WEIGHT |
| --- | --- |
| Molasses | 18–65 |
| Monoammonium Phosphate | 0–10 |
| Ammonium Polyphosphate | 5–9 |
| Attapulgite Clay | 0.5–5.0 |
| Water | 5–20 |
| Fat Source | 5–30 |
| Magnesium Oxide | 3–15 |
| Nutritional Iron Source | 6 |

Additionally, ferrous sulfate in an amount of about 8% by weight can be added to the formulation to decrease the setting time.

The above identified formulation, in block form, entices the young nursing pig to consume large quantities of dry matter. This is beneficial due to inherent nutritional problems the baby pig experiences its first week of life. A newborn pig is likely to double its initial weight in its first week of life. The amount of blood will also double in the first week of life. Blood contains about 85% of the iron in a baby pig. As more weight is added to the young pig, its hemoglobin value decreases and the danger of iron deficiency anemia becomes more apparent if no supplemental iron is available. When the aforementioned formulation is administered to the baby pig in a convenient block form, the magnitude of the drop in hemoglobin value is minimized and yet adequate weight gain to the pig is still accomplished.

Many iron compounds may be employed as the nutritional iron source in the present invention in amounts effective to provide at least 8 gm % hemoglobin value in 21 day old nursing pigs. Hemoglobin values below this amount are commonly considered to indicate an anemic condition in 21 day old nursing pigs. The iron compound should be present in an amount effective to provide an added elemental iron content ranging from about 1.5 to 3.5% by weight. The iron compounds providing this added amount of elemental iron may be salts of both weak and strong acids. Suitable iron salts include ferrous chloride, ferrous sulfate, ferric ammonium citrate, ferrous fumarate, ferrous lactate, ferrous maleate, ferric acetate, ferric chloride, ferric citrate, ferrous maleate, ferric succinate and the like. The preferred salt is ferrous fumarate and as a salt, it may be present in the formulation at about 6% by weight.

Ferrous sulfate is used as a blocking agent as well as nutritional source of iron in an alternate embodiment of the present invention. The presence of the ferrous sulfate in an amount of about 8% by weight shortens the set up time of the block. A block containing about 8% ferrous sulfate may set up within the hour at ambient temperature. The absence of ferrous sulfate in the block formulation leads to a set up time of about 24 hours at 100°–110° F. When ferrous sulfate is used as a blocking agent and nutritional source of iron, other iron compounds can be added to the block as nutritional sources, but the usual added amount of elemental iron (including the ferrous sulfate) ranges from about 1.5 to 3.5% by weight.

A sweetening agent may optionally be added to the supplement formulation such as sucrose, dextrose and the like. This is not meant to be limiting for many sweetening agents are known to skilled workers in the art and they may be included. The sweetening agent may be present in the formulation in sufficient quantities so that the young pigs consume enough of the supplement to ihibit iron deficiency anemia up to 21 days of age. Generally, at that time, the young pigs are weaned and placed on a dry feed containing high amounts of iron.

The molasses used in the formulation can be any commercial molasses product. The molasses can be any of the sugar containing molasses such as those obtained as the by products of the processing of sugar beets, sugar cane, corn or wood. Exemplary of these are blackstrap molasses, converted molasses, wood sugar molasses, hydrol syrup, citrus molasses and the like. Molasses and varying amounts of solids which affect its viscosity and the measure of the amount of such solids is normally given in terms of Brix. With no intention to limit the present invention, for the consistency of the molasses that may be used has a wide variance, the Brix of commercially available molasses which may be used in the invention normally falls within the range of 60° to 90° Brix. The concentration of the molasses in the process and product of this invention is generally from about 18 to 65% by weight and preferably from about 18 to 52 percent by weight.

With respect to the clay constituent in the formulation, it is generally present in the process and product in amounts ranging from about 0.5 to about 5.0% by weight and preferably in an amount from about 1.0 to 1.5% by weight. The clay should be water absorbent and those that can be employed include attapulgite clay, bentonite, kaolin and mixtures thereof. Attapulgite clay is preferred although satisfactory results are obtained with all the aforementioned clays. The function of the clay is believed to be a suspending agent which upon high speed shear mixing suspends and prevents segregation of the other ingredients of the formulations throughout the mixture which sets into a hard animal feed block.

The phosphorous source should be water soluble and added to the nutrient block formulation in an amount effective to aid in dispersing the water absorbent clay in such a manner to fully utilize its capabilities as a suspending agent. A preferable phosphorous source is ammonium polyphosphate and is desirably present in amounts ranging from about 5 to about 9% by weight. Another phosphorous source that is particularly suitable is tetra sodium pyrophosphate and is preferably present in the block formulation in amounts ranging from about 1 to about 3% by weight. For nutritional purposes, monoammonium phosphate can be added to the nutrient block formulation in amounts ranging from about 0 to about 5% by weight. In another embodiment of the present invention containing ferrous sulfate, the phosphorous source is a monobasic salt of phosphoric acid, preferably monoammonium phosphate in amounts ranging from about 4 to about 9% by weight. Ammonium polyphosphate may optionally be added at levels of 0 to 5% by weight.

The fats which may be added to the nutrient block formulation include livestock and edible animal fats such as grease, bleachable fancy tallow, yellow grease, beef fat, lard and the like. The fat source used in the present invention provides energy to the animal as well as aids in the blocking process. The fat source is considered a major energy source even though other materials known to skilled workers, i.e., molasses, provide energy to the baby pig. When the term 'energy source' is used herein, it refers primarily to fat and other known energy supplying ingredients. Fat is present in amounts ranging from about 5 to about 30% by weight. Preferably, it is present at 30% by weight to provide maximum weight gain for the young pigs.

A critical ingredient in the nutrient block formulation is magnesium oxide. The function of magnesium oxide in the block formulation is not completely understood, but it is believed to have water binding properties to facilitate the formation of a hard feed block. It should be present in the formulation in an effective amount to set the nutrient block within a relatively short period of time, that is, less than 24 hours at 50° C. Preferably, the amount should range from about 3 to about 15% by weight and most preferably at 7% by weight.

The interactions of water and the ingredients in the animal feed supplement is unusual. At the stated added moisture content, about 5-20% by weight, with a molasses content of about 18 to about 65% by weight, there is sufficient free water available to aid in the convenient preparation of the block. The formulation has liquid flow properties when being mixed and becomes hard upon mixing with magnesium oxide and ferrous sulfate or with magnesium oxide alone. The water activity ($A_w$) of the block should be at least 0.80 and not more than about 0.90. Water activity ($A_w$) is defined as the ratio of the vapor pressure exerted by the water contained in the block formulation (P) to the vapor pressure of pure water ($P_o$) at the same temperature. Water activity also can be defined as the equilibrium relative humidity (ERH) in which a food would neither gain nor lose moisture. In equation form this becomes $$A_w = P/P_o = ERH/100$$

The $A_w$ for pure water at any temperature above its freezing point is 1.0. The $A_w$ of any food material will be in the range of 0–1.0. The $A_w$ of conventional animal feed supplements in block form range from about 0.30 to 0.60. The $A_w$ of the present feed supplement being at least 0.80 approaches that of a semi-moist food. The animal feed supplement in block form of the instant invention has shown stability for long periods of time, at least six months, when stored at ambient temperatures or in the field.

In accordance with the present invention, in a method of treating or inhibiting iron deficiency anemia, the aforementioned formulation in block form is supplied ad libitum by merely securing it in the pig pen for consumption by the nursing or baby pigs preferably after their first day of life through 21 days of age.

The following Examples are presented for the purpose of further explaining the present invention and are not to be taken as limiting in any regard. Unless otherwise indicated, all percentages are by weight.

EXAMPLE I

This Example illustrates the preparation of the feed block and its acceptance by baby pigs as well as its hemitinic value. Following are two formulations that were made into block form.

| INGREDIENTS | BLOCK A | BLOCK B |
|---|---|---|
| Molasses | 18.45 | 18.45 |
| Water | 15.0 | 15.0 |
| Ammonium Polyphosphate | 5.0 | — |

-continued

| INGREDIENTS | BLOCK A | BLOCK B |
|---|---|---|
| Attapulgite Clay | 1.5 | 1.5 |
| Bleachable Fancy Tallow | 30.0 | 30.0 |
| Calcium Carbonate | 5.0 | — |
| Sucrose | 12.0 | 12.0 |
| Ferrous Fumarate | 6.0 | 6.0 |
| Magnesium Oxide | 7.0 | 3.0 |
| Monoammonium Phosphate | — | 6.0 |
| Ferrous Sulfate | — | 8.0 |

The compositions were prepared by subjecting molasses, water, the phosphate source and clay to high speed shear action in a Waring blender for two minutes. Subsequently, the other ingredients were added with mixing, and with the addition of magnesium oxide last in order to obtain a hard feed supplement block for baby pigs. Block B set into a depackagable block form in approximately one hour at room temperature and had a $A_w$ of 0.87. Block A set into a depackagable block form in 24 hours at 50° C. and had a $A_w$ of 0.87. Twenty-seven blocks of each formulation were prepared. Newborn pig litters were divided into three sections. Group I was not given either block and served as a control, Group II was given Block A and Group III was given Block B. At one day of age, the pigs in each litter weighed an average of 3 pounds. They were again weighed at 21 days of age and a hemoglobin value (grams of hemoglobin per 100 ml of blood) was taken.

| | DATA SUMMARY | | |
|---|---|---|---|
| | GROUP I (CONTROL) | GROUP II (BLOCK A) | GROUP III (BLOCK B) |
| Weight gain, lbs. | 6.6 | 7.5 | 7.4 |
| Hemoglobin, gm., % | 6.7 | 8.0 | 9.6 |
| BLOCKS/litter, lbs. | — | .7 | 2.8 |

It is recognized by those skilled in the art that a 21 day old pig must have a hemoglobin value of 8.0 gm % or above in order not to be considered anemic. This experiment shows that hemoglobin values are significantly increased by administering a block containing ferrous fumarate or a combination of ferrous fumarate and ferrous sulfate. The pigs in Group I, without an iron source demonstrated iron deficiency anemia. Further, the pigs in Group II and III exhibited an increased weight gain of those in the control group.

EXAMPLE II

The hemoglobin value can be greatly increased if the baby pig receives supplemental iron in addition to the feed block of the present invention. Since Block A of Example I has shown its efficacy as a hemitinic, it was again formulated according to the process in Example I and fed to a number of baby pigs. However, one Group (I) of pigs received 1 cc of Pigemia ® brand iron dextrin to provide 100 mg of iron at one day of age prior to receiving Block A. Pigemia ® brand iron dextrin is manufactured by Ralston Purina Company, St. Louis, Mo. Another Group (II) received only the iron injection and were not given the block. A third Group (III) acted as a control and received neither an iron injection or the block. At 21 days of age all of the pigs were weighed and their hemoglobin values determined.

| | DATA SUMMARY | | |
|---|---|---|---|
| Treatment | Group I | Group II | Group II |
| Block | + | — | — |
| Iron Injection | + | + | — |
| Number of pigs | 42 | 43 | 40 |
| Initial Weight, lb. | 2.89 | 2.7 | 2.80 |
| Final Weight, lb. | 12.35 | 11.09 | 10.80 |
| Gain, 21 Days | 9.46 | 8.39 | 8.0 |
| Hemoglobin | 10.25 | 10.15 | 5.83 |
| Blocks/Litter | 1.11 | | |

Pigs given the iron injection plus the block gained significantly more weight and had higher hemoglobin values than the control group. The usually high weight gain by Group I may be accounted for by the pigs development of a taste for dry feed.

The soft texture of the block and the presence of an optional sweetening agent makes the block appealing to baby pigs. The palatability of the block encourages adequate consumption so that adequate hemoglobin values are maintained to prevent iron deficiency anemia.

It will be seen from the above that the use of an animal feed supplement in block form described herein provides a technique for the prevention of iron deficiency anemia and still provide means for considerable growth. By its use, it is possible to administer high amounts of energy sources to the baby pig while maintaining adequate hemoglobin values to prevent iron deficiency anemia until the baby pig is weaned and placed on dry feed. However, it will be appreciated by those skilled in the art that many variations and modifications can be made to the particular Examples and illustrations of the invention provided above without departing from the scope of the invention as defined by the following claims.

What is claimed is:

1. A method of preventing iron deficiency in baby pigs comprising the steps of administering a hard nutrient feed block to the baby pigs, said block comprising about 1.5 to 3.5% by weight elemental iron, about 5 to about 30% by weight fat, about 3 to 15% magnesium oxide, about 1 to 9% phosphorous source, about 0.5 to 5.0% clay.

2. The method of claim 1 wherein said block contains about 8% ferrous sulfate.

3. The method of claim 1 wherein an iron compound is selected from the group consisting of ferrous chloride, ferrous sulfate, ferric ammonium citrate, ferrous fumarate, ferrous lactate, ferrous maleate, ferric acetate, ferric chloride, ferric citrate, ferrous maleate, and ferric succinate.

4. The method of claim 3 wherein the iron compound is ferrous fumarate.

5. The method of claim 1 wherein the fat source is selected from the group consisting of edible animal fats, grease, bleachable fancy tallow, yellow grease, lard and beef fat.

6. The method of claim 5 wherein the fat source is bleachable fancy tallow.

7. The method of claim 1 wherein the phosphorous source is selected from the group consisting of ammonium polyphosphate, monoammonium phosphate and tetrasodium pyrophosphate.

8. The method of claim 7 wherein the phosphorous source is ammonium polyphosphate.

9. A method of treating or preventing iron deficiency anemia in baby pigs by feeding said pigs a molasses-based feed block comprising an energy source utilizing fat, said fat being selected from the group consisting of edible animal fats, grease, bleachable fancy tallow, yellow grease, lard and beef fat, from about 3 to about 15% magnesium oxide and an effective amount of an iron source to provide at least 8 gm% hemoglobin in 21 day old nursing pigs.

10. The method of claim 9 wherein the molasses-based feed block includes elemental iron in amounts ranging from about 1.5 to about 3.5% by weight.

11. The method of claim 9 wherein the molasses-based feed block includes about 8% ferrous sulfate by weight.

* * * * *